United States Patent [19]

Kitaoka et al.

[11] Patent Number: 5,500,519
[45] Date of Patent: Mar. 19, 1996

[54] FOCUS DETECTION DEVICE AND METHOD OF ADJUSTING FOCUS DETECTION DEVICE COMPRISING INDEPENDENT PUPIL ADJUSTMENT OF MOVEABLE FIELD LENSES

[75] Inventors: Naoki Kitaoka, Chiba; Keiji Ohsawa, Tokyo, both of Japan

[73] Assignee: Nikon Corporation, Tokyo, Japan

[21] Appl. No.: 360,054

[22] Filed: Dec. 20, 1994

[30] Foreign Application Priority Data

Dec. 27, 1993 [JP] Japan .................................. 5-330797

[51] Int. Cl.$^6$ ............................ G03B 13/36; G02B 7/09
[52] U.S. Cl. ...................... 250/201.8; 250/216; 354/407
[58] Field of Search ............................ 250/201.8, 201.2, 250/201.6, 201.7, 216; 354/407, 406, 402, 408

[56] References Cited

U.S. PATENT DOCUMENTS

| | | | |
|---|---|---|---|
| 4,792,669 | 12/1988 | Ohnuki et al. | 250/201.8 |
| 4,914,282 | 4/1990 | Akashi et al. | 250/201.8 |
| 4,992,818 | 2/1991 | Karasaki et al. | 250/201.8 |
| 5,004,902 | 4/1991 | Matsui et al. | 250/201.8 |
| 5,138,359 | 8/1992 | Nagano et al. | 250/201.8 |
| 5,159,383 | 10/1992 | Ishida et al. | 354/406 |
| 5,424,528 | 6/1995 | Goto | 250/201.8 |

FOREIGN PATENT DOCUMENTS 62-161111  7/1987  Japan .
63-11906   1/1988  Japan .

*Primary Examiner*—Edward P. Westin
*Assistant Examiner*—John R. Lee
*Attorney, Agent, or Firm*—Oliff & Berridge

[57] ABSTRACT

In order to obtain a focus detection device that can perform pupil adjustment accurately in all of a plurality of focus detection areas, field lenses corresponding to each focus detection area in a focus detection device having a plurality of focus detection areas are comprised of separate materials for each focus detection area, and independent adjustment of the eccentricity of the field lens corresponding to each focus detection area is made possible in the plane perpendicular to the optical axis of each field lens so that pupil adjustment can be performed independently for each of the plurality of focus detection areas.

13 Claims, 6 Drawing Sheets

FOCUS DETECTION DEVICE AND METHOD OF ADJUSTING FOCUS DETECTION DEVICE COMPRISING INDEPENDENT PUPIL ADJUSTMENT OF MOVEABLE FIELD LENSES

BACKGROUND OF THE INVENTION

1. Field of the Invention

The present invention relates to an adjustment device in a phase difference focus detection device used in single-reflex type cameras that detects the amount of focus deviation from the deviation of secondary images, and in particular, the invention relates to an adjustment device that causes the optical axis of the camera body and the optical axis of the focus detection unit in the phase difference focus detection device to coincide, in what is known as pupil adjustment.

2. Description of Related Art

A case wherein a phase difference focus detection block is incorporated into a single-reflex camera will be described hereafter with reference to FIG. 4.

A quick return mirror 20 having a half-reflective area in its center is positioned between the photographic lens 1 and the film plane 31. Light rays passing through the photographic lens 1 are reflected upward by the quick return mirror 20, these reflected light rays being directed to a viewfinder system comprised of a focussing plate 22, a condenser lens 23, a pentagonal prism 24 and an eyepiece lens 25. Light rays that pass through the half-reflective area of the quick return mirror 20 are reflected by a sub-mirror 21 and are directed to a focus detection block 11. The focus detection block 11 is comprised of a unit 10 to which a field of vision mask 2, a field lens 3, a diaphragm mask 4, reimaging lenses 5a1 and 5a2, a line sensor 6 and a reflecting mirror 7 are solidly fixed.

FIG. 5 is a diagram showing the structure of a standard phase difference focus detection optical system. The field of vision mask 2 is a device that restricts unnecessary light from outside the focus detection field of vision, the field lens 3 being comprised of a lens that places the pair of apertures 4a and 4b of the diaphragm mask 4 and the exit pupil of the photographic lens 1 in a conjugal relationship. The pair of reimaging lenses 5a1 and 5a2 are devices that re-image light rays passing through the various regions of the exit pupil of the photographic lens 1 on the line sensor 6, the line sensor 6 being comprised of a photosensitive element comprised of two components 6a1 and 6a2, which could, for example, be a CCD, which comprises a charge accumulation type photosensitive element. The mutual relationship between the positions of the two images formed by reimaging is found from an electrical signal from the photosensitive element comprised of the two components 6a1 and 6a2, from which the focus deviation amount of the photographic lens 1 can be calculated.

When the optical axis of the focussing block determined from the field of vision mask 2 through the reimaging lenses 5a1 and 5a2 does not coincide with the optical axis of the photographic lens 1 of the camera, the apertures 4a and 4b of the diaphragm mask 4 are not projected to the correct position on the exit pupil of the photographic lens 1 by the field lens 3. Because of this, an eclipse phenomenon occurs, wherein light rays that should enter the reimaging lenses 5a1 and 5a2 are blocked by the exit pupil of the photographic lens, having a negative effect on the precision of focus detection.

Therefore, adjustment known as pupil adjustment is necessary, wherein the optical axis of the photographic lens 1 of the camera and the optical axis of the focussing block from the field of vision mask 2 through the reimaging lenses 5a1 and 5a2 are made to coincide. Specifically, pupil adjustment consists of the focus detection block 11 being mounted on the camera body using three screws and springs so that the optical axis can be adjusted by changing the inclination of the entire focus detection block 11 by turning the screws. It is also possible to move the field lens 3 in a plane perpendicular to the optical axis of the lens, as is set forth in Japanese Laid Open Patent Application No. 62-161111 (page 3, from line 15 of the upper right column through line 6 of the lower left column).

A device in which focus detection is performed on a plurality of areas on the screen in a focus detection device used in a camera is set forth in Japanese Laid Open Patent Application No. 63-11906 (FIG. 1 and line 12 of the upper right column of page 2 through line 3 of the second left column of page 3).

FIG. 6 presents an example where focus detection is performed on the three areas shown therein, in which the basic structure of the optical system does not differ from that of FIG. 4.

Light rays passing through the half-reflective area of the quick return mirror 20 are reflected by the sub-mirror 21 and directed to the focus detection block 90, the focus detection block 90 being comprised of a field of vision mask 12, a field lens 13, a diaphragm mask 14, a reimaging lens 15, a line sensor 16 and a mirror 7. These structures are fixed to a unit formed of synthetic resin or similar material (not shown in the drawing).

The field of vision mask 12 has three apertures 12a, 12b and 12c. In FIG. 6, the center aperture 12a of the field of vision mask 12 is horizontal, while the other two apertures 12b and 12c are vertical. The field lens 13 has three lens units 13a, 13b and 13c formed as a single entity. The diaphragm mask 14 also has three pairs of diaphragm apertures, as indicated by the dashed lines.

The reimaging lens 15 has three pairs of reimaging lens components 15a1 and 15a2, 15b1 and 15b2, and 15c1 and 15c2, and the line sensor 16 includes three pairs of light receptors 16a1 and 16a2, 16b1 and 16b2, and 16c1 and 16c2 corresponding to the three areas. The field of vision mask 12a, 12b and 12c, the field lens 13a, 13b and 13c, the diaphragm mask 14a, 14b and 14c, the reimaging lens 15a, 15b and 15c and the line sensor 16a, 16b and 16c comprise independent optical systems that perform focus detection in each of the three areas.

However, in adjusting the above-described focus detection block 90, which performs focus detection in three areas, when pupil adjustment is performed for one area by attaching the focus detection block 90 to the camera body using screws and springs and changing the inclination of the focus detection block 90 as a whole by turning the screws, independent adjustment of the other two areas cannot be performed.

In addition, even when the field lens 13 is moved in a plane perpendicular to its optical axis, as set forth in Japanese Laid Open Patent Application No. 62-161111, when the field lenses corresponding to each area are formed as a single entity as in Japanese Laid Open Patent Application No. 63-11906, adjustment can be performed on only one area.

SUMMARY OF THE INVENTION

An object of the present invention is to provide a focus detection device that can perform accurate and precise pupil adjustment in all of a plurality of focus detection areas. A method of adjusting a focus detection device is also provided.

With the disclosed embodiments of the present invention, during adjustment of the focus detection block of a focus detection device having a plurality of focus detection areas, in order to make the optical axis of the photographic lens of the camera coincide with the optical axis of each detection block from the field of vision mask through the reimaging lens corresponding to each focus detection area, pupil adjustment is performed independently on each field lens corresponding to each focus detection area. This is possible because a structure is used in which adjustment of the eccentricity can be performed independently for the optical axis of the field lens corresponding to each area.

BRIEF DESCRIPTION OF THE DRAWINGS

The invention will be described in conjunction with the accompanying drawings in which like reference numerals designate like elements and wherein.

DETAILED DESCRIPTION OF PREFERRED EMBODIMENTS

Figure 1:
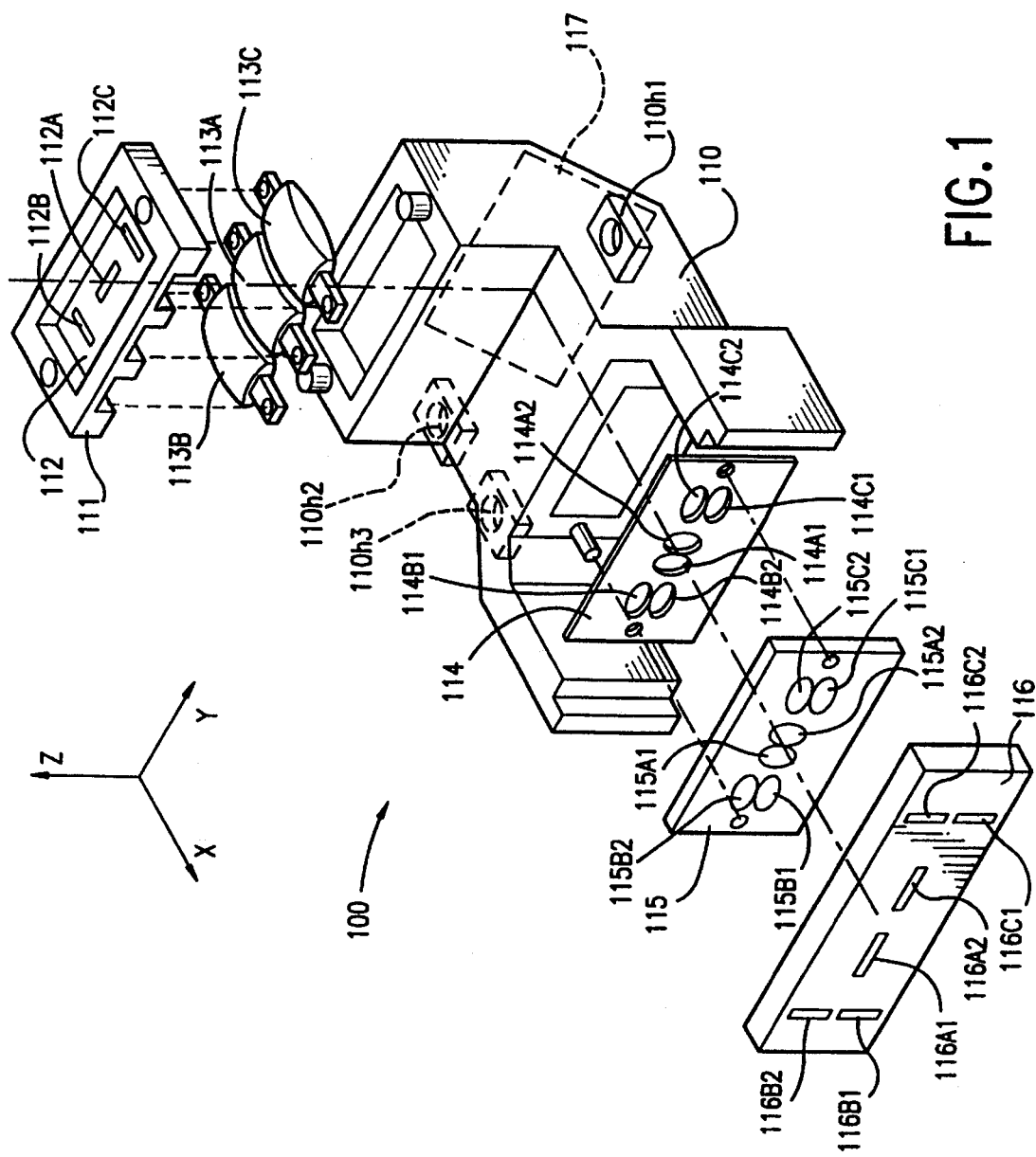
FIG. 1 is an exploded, perspective view of the basic structure of a focus detection device according to an embodiment of the present invention.

FIG. 1 illustrates a focus detection device according to an embodiment of the present invention, providing an oblique view showing the structure of the focus detection block 100.

There are a total of three focus detection areas in FIG. 1, with one in the center and one each on the right and left, the independent optical systems that perform focus detection for each area being comprised of a field of vision mask 112A, 112B and 112C; a field lens 113A, 113B and 113C; a diaphragm mask 114A, 114B and 114C; a reimaging lens 115A, 115B and 115C; and a line sensor 116A, 116B and 116C.

The reimaging lens 115 is provided with three pairs of re-imaging lens components 115A1 and 115A2, 115B1 and 115B2, and 115C1 and 115C2. In addition, on the line sensor 116 are three pairs of light receptors 116A1 and 16A2, 116B1 and 116B2, and 116C1 and 116C2, which correspond to the three areas.

Each of the field lenses 113A–113C corresponding to the focus detection areas is a separate component so that independent pupil adjustment can be performed for each detection area, and adjustment of the eccentricity of each field lens can also be performed independently in a plane perpendicular to the optical axis of each field lens.

Figure 2:
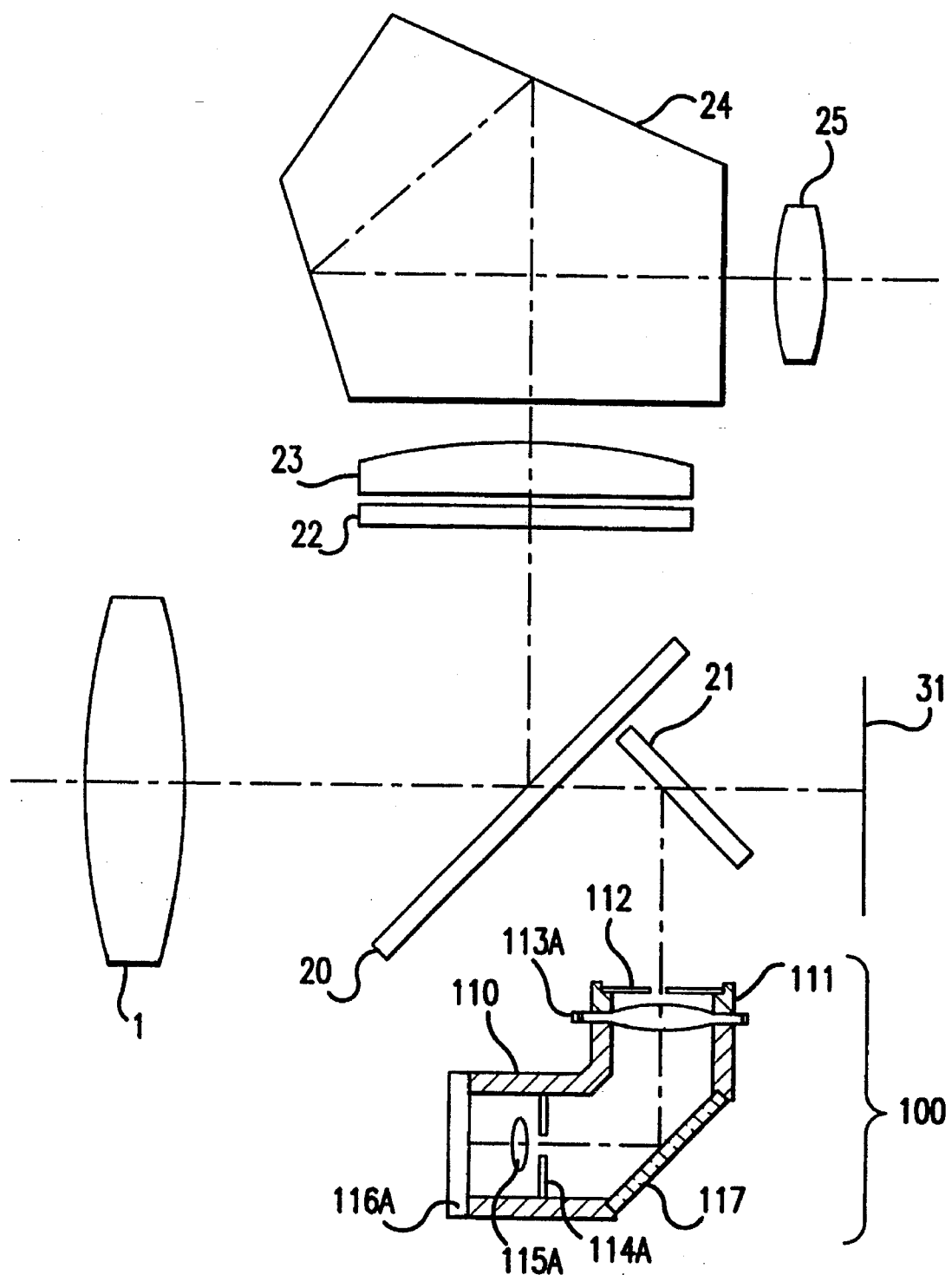
FIG. 2 is a cross-sectional view of the FIG.1 focus detection device incorporated in a camera.
Figure 4:
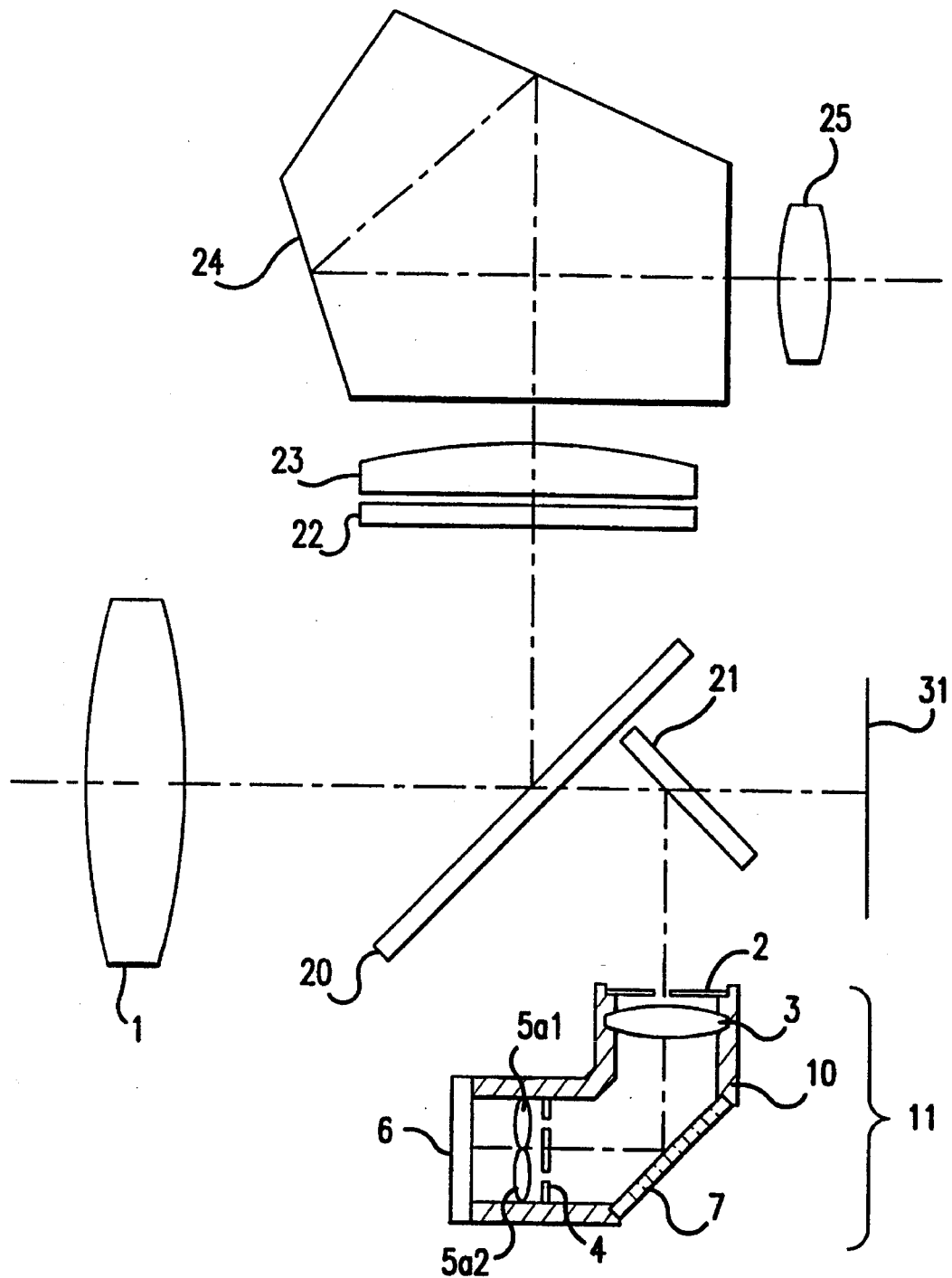
FIG. 4 is a cross-sectional view showing the basic structure of the optical system of a conventional focus detection device.
Figure 5:
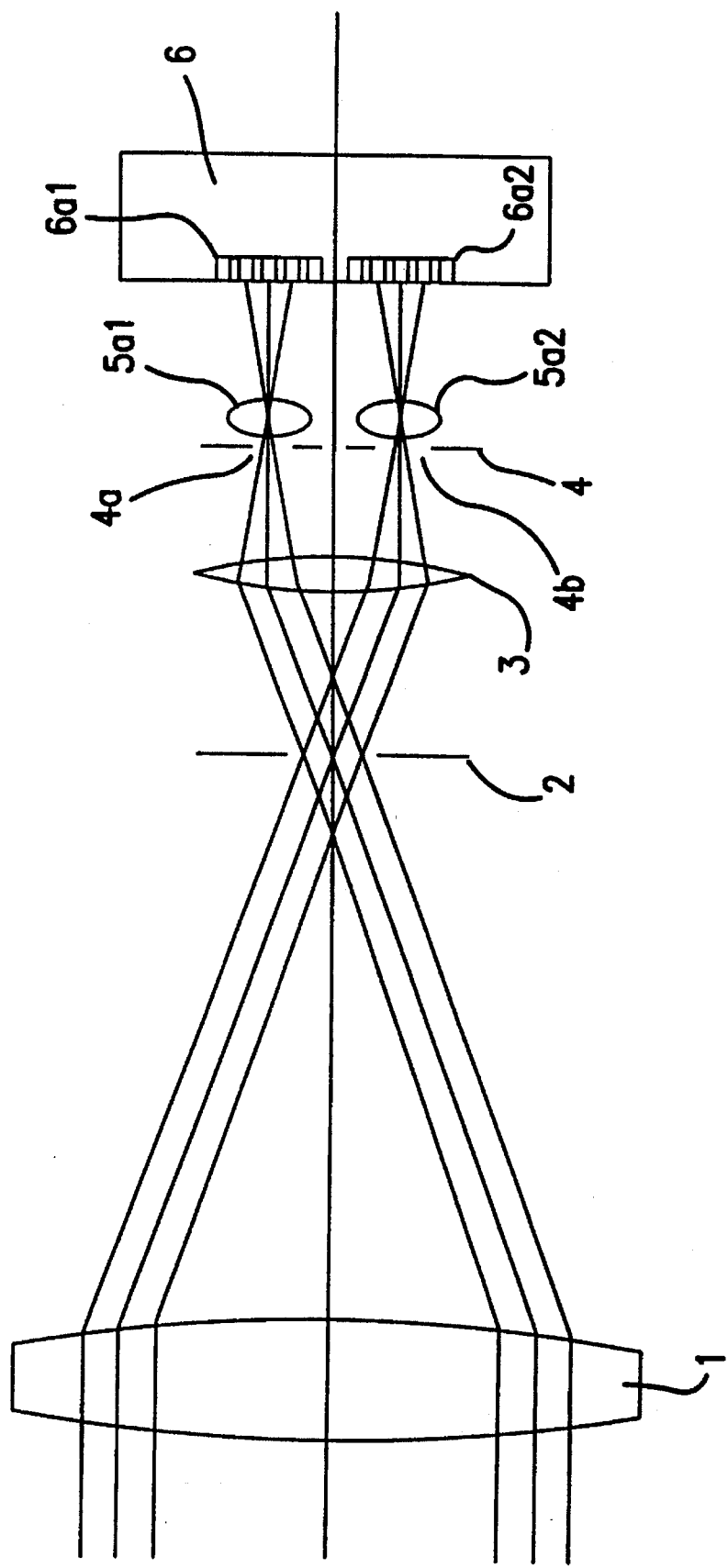
FIG. 5 is a diagram showing the basic structure of a phase difference focus detection device.
Figure 6:
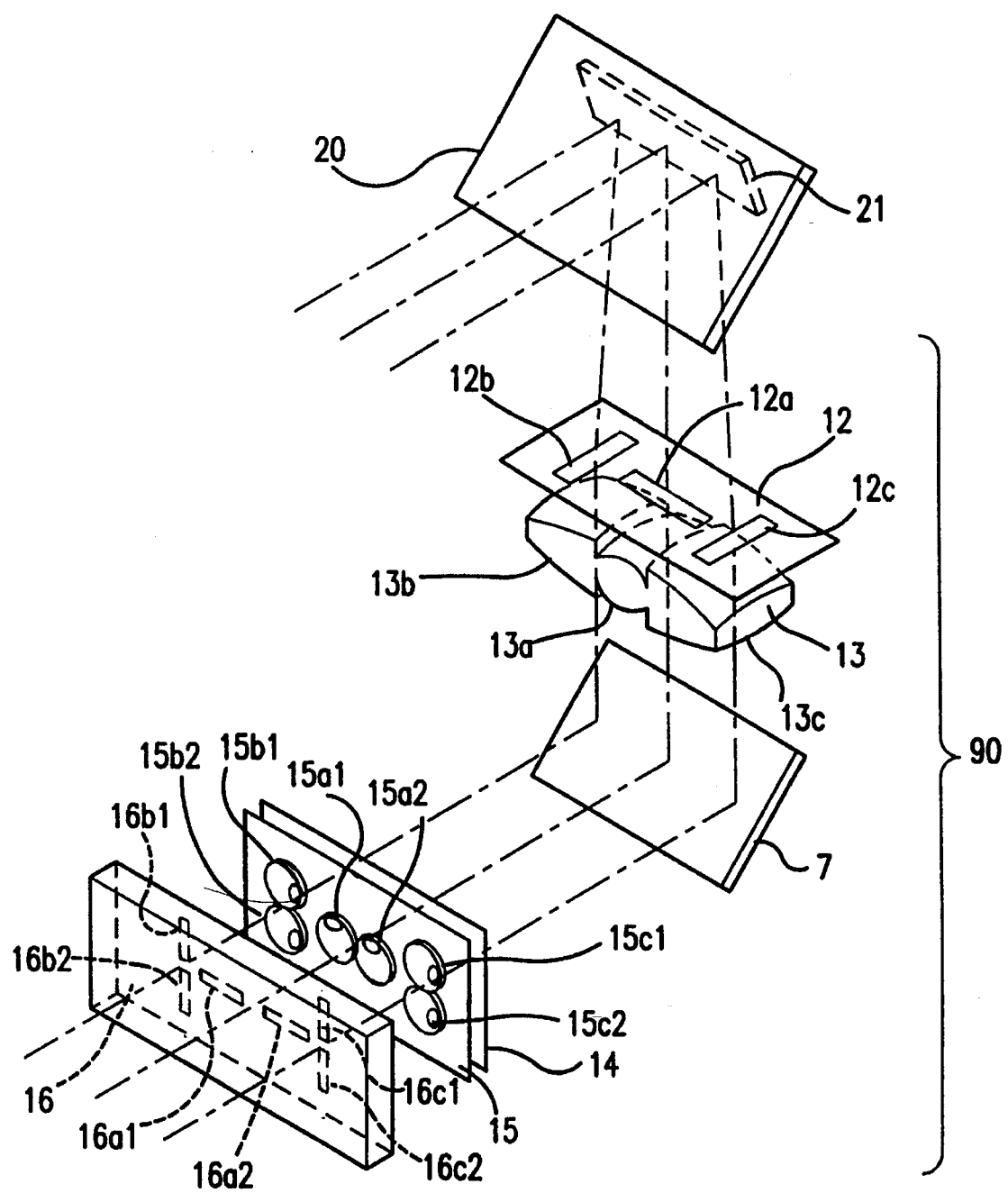
FIG. 6 is an oblique view showing the structure of a focus detection device having a plurality of focus detection areas.

FIG. 2 is a cross-section of a case wherein the focus detection block 100 where focus detection is performed in three areas is applied to a single-reflex camera. The basic optical structure is the same as in FIG. 4, and structures that correspond to structures in FIG. 4 are identified with symbols identical to those in FIG. 4. Because the center area is horizontal, the reimaging lenses 115A and the apertures of the diaphragm masks 114A appear as single entities.

Figure 3:
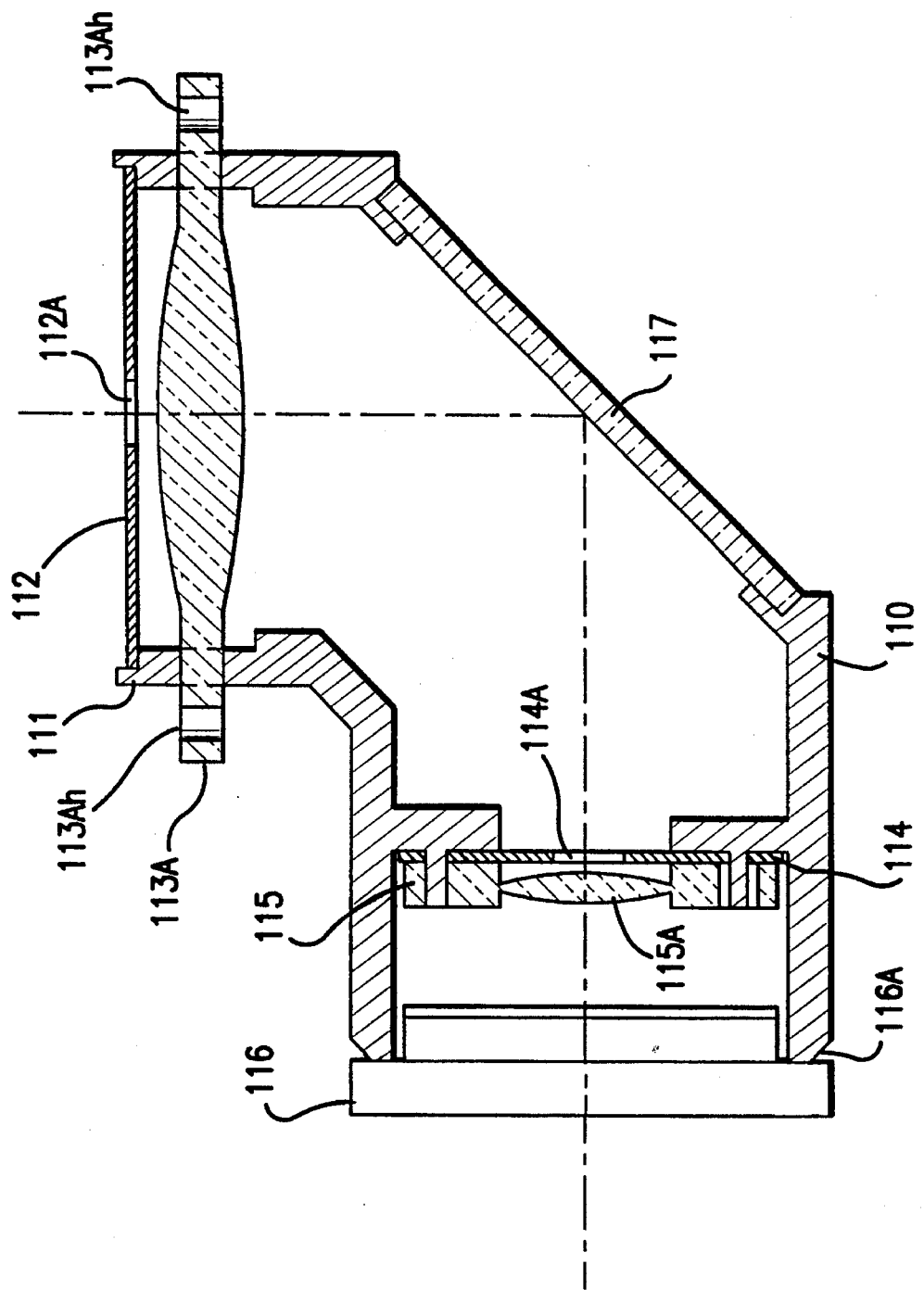
FIG. 3 is a cross-sectional view of the FIG. 1 focus detection device according to the present invention.

FIG. 3 is an enlargement of the focus detection block 100 of FIG. 1. The mirror 117, diaphragm mask 114A, reimaging lens 115A and line sensor 116A, which comprise the optical system corresponding to the center focus detection area, are fixed to the unit 110. In addition, a field of vision mask unit 111, which holds the field of vision mask 112, is fixed to the main unit 110 so as to enclose the field lens 113A.

The field lens 113A has a hole 113Ah into which an adjustment pin is inserted, this pin comprising the tool used for pupil adjustment. Prior to pupil adjustment, the field lens 113A may be located between the field of vision mask unit 111 and the main unit 110, adjustment of the eccentricity of the field lens 113A being accomplished in the plane perpendicular to its optical axis. Following pupil adjustment, the field lens is fixed to the main unit 110 by means of an adhesive agent.

The steps in adjusting the focus detection device will be described hereafter, with reference to FIG. 1.

First, the reflecting mirror 117, the diaphragm mask 114 and the reimaging lens 115 are fixed to the main unit 110 by means of an adhesive, at which point no special adjustment is necessary. In addition, the field of vision mask unit 111, which holds the field of vision mask 112, is also fixed to the main unit 110 by means of an adhesive, at which time the field lenses 113A–113C are inserted. The field lenses 113A–113C are positioned between the main unit 110 and the field of vision mask unit 111 without being fixed, and movement is possible in the X–Y plane, which is perpendicular to the optical axis of each field lens.

Next, the line sensor 116 is fixed to the main unit 110 using an adhesive agent after being aligned with respect to the reimaging lens 115.

After the described assembly operations have been completed, pupil adjustment is performed through adjustment of the eccentricity of the field lens 113A in the X–Y plane in order to cause the optical axis of the photographic lens 1 of the camera to coincide with the optical axis of the focussing block from the field of vision mask 112A through the reimaging lenses 115A1 and 115A2 corresponding to the focus detection area.

The criteria for adjustment in this case is performed using a known mirror box for tools and an exit pupil for the tools (not shown in the drawing), as disclosed in U.S. Pat. No. 4,792,669, the disclosure of which is hereby incorporated by reference. Furthermore, field lens adjustment pins (not shown in the drawing) are inserted into each of the two holes provided in the field lens 113A and are provided in the mirror box, adjustment of the eccentricity of the field lens 113A in the X–Y plane being accomplished by moving the field lens adjustment pins. After pupil adjustment has been completed, the field lens 113A is fixed in the post-adjustment position using an adhesive agent. The described operations are also performed in the same manner on the left and right field lenses 113B and 113C, after which adjustment of the focus detection device unit as a whole is completed.

Next, the adjusted main unit 110 is removed from the adjustment tool(s) and is incorporated into the front body of the camera. Attachment to the camera is accomplished by fixing the arm of the main unit 110 and the front body of the camera to each other by placing screws (not shown in the drawing) through the three holes 110h1–110h3 in the arm of the main unit.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A phase difference focus detection device that detects focus in a plurality of regions in a photo taking field from light passing through a photographic lens having a first optical axis, the phase difference focus detection device comprising:

a plurality of field lenses each independently collecting light corresponding to each of said plurality of regions;

a pair of reimaging lenses receiving light transmitted through each of the plurality of field lenses, each pair of reimaging lenses forming a subject image in each of said plurality of regions by reimaging light corresponding to each of said plurality of regions;

a pair of diaphragm masks positioned near each pair of reimaging lenses, each pair of diaphragm masks regulating light coming through the pair of reimaging lenses; and a pair of rows of photosensitive elements receiving the subject image corresponding to each of said plurality of regions, wherein a second optical axis from the plurality of field lenses to the pair of reimaging lenses and the first optical axis of the photographic lens are made to coincide, and wherein eccentricity adjustment can be performed independently on each of the plurality of field lenses.

2. A phase difference focus detection device for focus detection in a plurality of focus detection regions in a photo taking field from light passing through a photographic lens having a first optical axis, the focus detection device comprising:

a focus detection block comprising an independent optical system performing focus detection for each focus detection region, said focus detection block comprising a second optical axis, each independent optical system comprising a movable field lens; and an adjustment mechanism coupled to the focus detection block, said adjustment mechanism enabling independent pupil adjustment of each movable field lens for each focus detection region and independent eccentricity adjustment of each movable field lens so that the first optical axis coincides with the second optical axis.

3. The phase difference focus detection device as claimed in claim 2, wherein each movable field lens comprises a third optical axis, said adjustment mechanism enabling independent eccentricity adjustment of each movable field lens in a plane perpendicular to said third optical axis.

4. The phase difference focus detection device as claimed in claim 2, wherein said adjustment mechanism enables each movable field lens to be maintained in a plane perpendicular to said first optical axis.

5. The phase difference focus detection device as claimed in claim 2, wherein said adjustment mechanism comprises at least one hole in each movable field lens, said at least one hole adapted to receive an adjustment pin effecting pupil adjustment.

6. The phase difference focus detection device as claimed in claim 5, further comprising fixing means for fixing said movable field lenses after pupil adjustment, thereby rendering said movable field lenses immovable.

7. The phase difference focus detection device as claimed in claim 6, wherein said fixing means comprises an adhesive agent.

8. A method of adjusting a focus detection device for focus detection in a plurality of focus detection regions in a photo taking field from light passing through a photographic lens having a first optical axis, wherein the focus detection device comprises a focus detection block including an independent optical system performing focus detection for each focus detection region, said focus detection block comprising a second optical axis, each independent optical system comprising a movable field lens, the method comprising:

enabling independent pupil adjustment of each movable field lens for each focus detection region and independent eccentricity adjustment of each movable field lens; and coinciding the first optical axis with the second optical axis.

9. The method as claimed in claim 8, wherein said focus detection block comprises a main unit to which a field of vision mask, said movable field lenses, a diaphragm mask, a reimaging lens, a line sensor and a reflecting mirror are fixed, the method further comprising:

fixing said reflecting mirror, said diaphragm mask and said reimaging lens to said main unit;

fixing a field of vision mask unit holding the field of vision mask to said main unit;

inserting said movable field lenses into said main unit such that they are movable in a direction perpendicular to an optical axis of each respective field lens;

fixing said line sensor to said main unit; and performing said independent pupil adjustment through eccentricity adjustment of the movable field lenses.

10. The method as claimed in claim 9, further comprising, after said performing step, fixing said movable field lenses in a post-adjustment position, thereby rendering said movable field lenses immovable.

11. The method as claimed in claim 8, further comprising, after said coinciding step, fixing said movable field lenses in a post-adjustment position, thereby rendering said movable field lenses immovable.

12. The method as claimed in claim 8, further comprising:

fixing components of said focus detection block to a main unit;

inserting said movable field lenses into said main unit such that they are movable in a direction perpendicular to an optical axis of each respective field lens; and performing said independent pupil adjustment through eccentricity adjustment of the movable field lenses.

13. The method as claimed in claim 12, further comprising, after said performing step, fixing said movable field lenses in a post-adjustment position, thereby rendering said movable field lenses immovable.

* * * * *